US012568020B2

(12) United States Patent
Mills et al.

(10) Patent No.: US 12,568,020 B2
(45) Date of Patent: Mar. 3, 2026

(54) ENDPOINT COMPUTER CONFIGURATION MANAGEMENT

(71) Applicant: Sophos Limited, Abingdon (GB)

(72) Inventors: Ryan Elliot Mills, Bubwith (GB); Jonathan Francis Caine, Abingdon (GB)

(73) Assignee: Sophos Limited (GB)

( * ) Notice: Subject to any disclaimer, the term of this patent is extended or adjusted under 35 U.S.C. 154(b) by 81 days.

(21) Appl. No.: 18/494,953

(22) Filed: Oct. 26, 2023

(65) Prior Publication Data

US 2025/0141744 A1 May 1, 2025

(51) Int. Cl.
H04L 41/0894 (2022.01)
H04L 41/084 (2022.01)
H04L 41/0893 (2022.01)

(52) U.S. Cl.
CPC ........ H04L 41/0894 (2022.05); H04L 41/084 (2013.01); H04L 41/0893 (2013.01)

(58) Field of Classification Search
CPC ............. H04L 41/0894; H04L 41/0893; H04L 41/082; H04L 41/5022; H04L 41/0803; H04L 41/0846; H04L 41/084
See application file for complete search history.

(56) References Cited

U.S. PATENT DOCUMENTS 7,072,958 B2 * 7/2006 Parmar ............... H04L 41/0894
709/223
7,150,037 B2 * 12/2006 Wolf ..................... H04L 63/083
726/17

7,995,498 B2 * 8/2011 Andrews ............. H04L 41/0886
370/254
8,108,905 B2 1/2012 Johns et al.
8,332,906 B2 * 12/2012 Roberts ................... G06F 21/31
713/1
9,007,631 B2 * 4/2015 Hagiwara ............... H04L 41/22
358/1.9
9,021,245 B2 * 4/2015 Guidotti ............... G06F 9/5072
713/100
9,503,480 B2 * 11/2016 Bharali ................... G06F 16/00
9,753,985 B2 * 9/2017 Mule ................... H04L 41/0886
9,860,274 B2 1/2018 Jacobs
(Continued)

OTHER PUBLICATIONS

Simpson, William R. and Kevin E. Foltz, "Enterprise End-point Device Management" Proceedings of the World Congress on Engineering 2018, vol. I, Jul. 4-6, 2018.

(Continued)

*Primary Examiner* — Alex Tran
(74) *Attorney, Agent, or Firm* — Schmeiser, Olsen & Watts LLP; Timothy P. Collins, Esq.

(57) ABSTRACT

A method comprises storing a policy type having a plurality of device settings for a plurality of endpoint computers; assigning a reference key to a device setting of the plurality of device settings, the reference key corresponding to a subset of endpoint computers of the plurality of endpoint computers; notifying the subset of the endpoint computers of the policy type; querying the database for a device setting of the plurality of device settings based on a current attribute of the endpoint computer; and fetching the device setting. Further disclosed are a computer system and computer program product configured to perform the method.

20 Claims, 9 Drawing Sheets

*200*

| STORE POLICY TYPES | 210 |
| ASSIGN REFERENCE KEY TO DEVICE SETTINGS | 220 |
| NOTIFY ENDPOINT COMPUTERS OF POLICY TYPE | 230 |
| QUERY DATABASE FOR RELEVENT SETTING | 240 |
| FETCH DEVICE SETTING | 250 |

(56) References Cited

U.S. PATENT DOCUMENTS

| 10,680,852 B2 * | 6/2020 | Agarwal | ............. | H04L 12/4641 |
| 10,904,294 B2 * | 1/2021 | Buerk | .................... | G06F 21/60 |
| 11,303,678 B2 | 4/2022 | Kuppannan et al. | | |
| 11,553,008 B1 | 1/2023 | Robinson et al. | | |
| 11,848,820 B1 * | 12/2023 | Fordos | ................ | H04L 41/5041 |
| 2003/0097427 A1 * | 5/2003 | Parry | .................... | H04L 67/34 |
| | | | | 709/220 |
| 2003/0149756 A1 * | 8/2003 | Grieve | ................ | H04L 41/0866 |
| | | | | 709/223 |
| 2010/0228958 A1 * | 9/2010 | Naito | ................. | G06F 15/7867 |
| | | | | 713/1 |
| 2019/0124115 A1 | 4/2019 | Chris | | |
| 2020/0177444 A1 * | 6/2020 | Nelson-Gal | ......... | H04L 41/0866 |
| 2023/0117962 A1 | 4/2023 | Kaimal et al. | | |

OTHER PUBLICATIONS

Abhashkumar, et al. "Supporting Diverse Dynamic Intent-based Policies using Janus" CoNEXT '17, Dec. 12-15, 2017.
Hinrichs, et al. "Expressing and Enforcing Flow-Based Network Security Policies" Mar. 18, 2009, University of Chicago, Tech. Rep. 9.

* cited by examiner

200
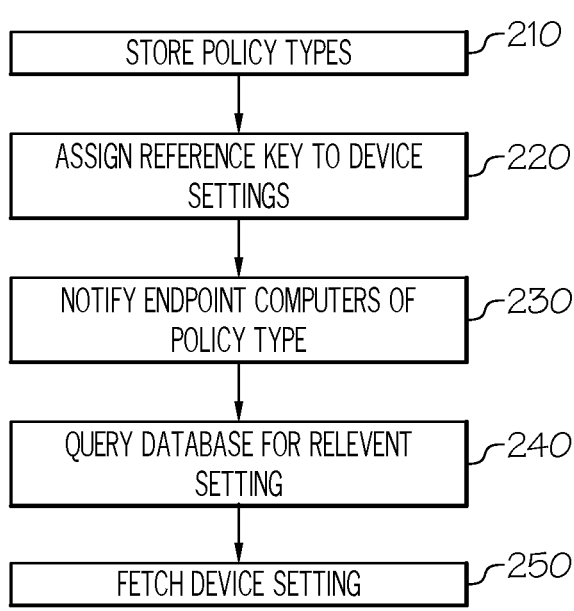
| STORE POLICY TYPES | 210 |
| ASSIGN REFERENCE KEY TO DEVICE SETTINGS | 220 |
| NOTIFY ENDPOINT COMPUTERS OF POLICY TYPE | 230 |
| QUERY DATABASE FOR RELEVENT SETTING | 240 |
| FETCH DEVICE SETTING | 250 |
FIG. 2

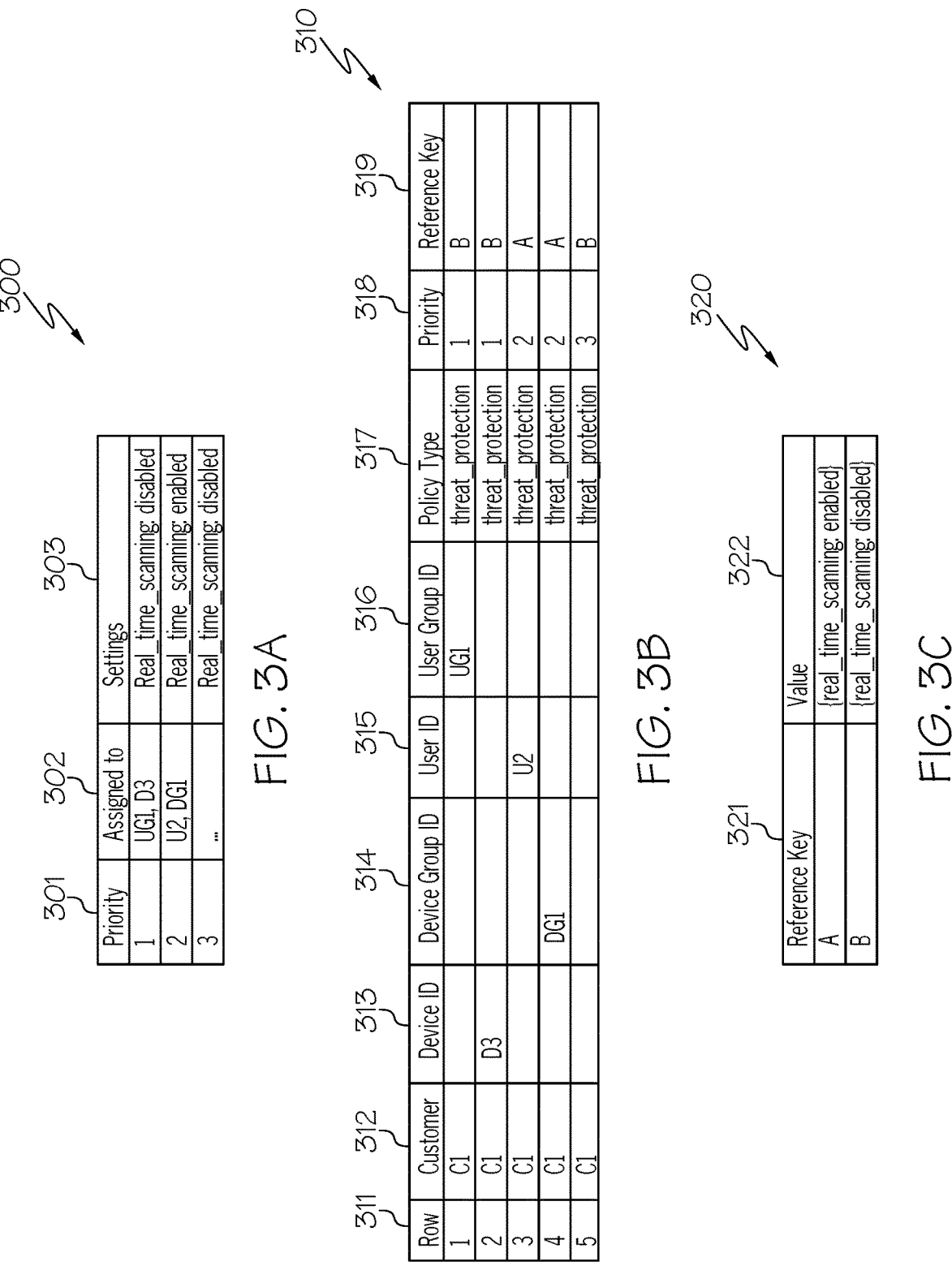

*300*

| Priority | Assigned to | Settings |
|---|---|---|
| 1 | UG1, D3 | Real_time_scanning disabled |
| 2 | U2, DG1 | Real_time_scanning enabled |
| 3 | ... | Real_time_scanning disabled |

| Row | Customer | Device ID | Device Group ID | User ID | User Group ID | Policy Type | Priority | Reference Key |
|---|---|---|---|---|---|---|---|---|
| 1 | C1 | | | | UG1 | threat_protection | 1 | B |
| 2 | C1 | D3 | | | | threat_protection | 1 | B |
| 3 | C1 | | | U2 | | threat_protection | 2 | A |
| 4 | C1 | | DG1 | | | threat_protection | 2 | A |
| 5 | C1 | | | | | threat_protection | 3 | B |

| Reference Key | Value |
|---|---|
| A | {real_time_scanning: enabled} |
| B | {real_time_scanning: disabled} |

| | Device | User | Device Group | User Group | Row(s) | Ref. Key | Setting |
|---|---|---|---|---|---|---|---|
| 331 | D1 | U1 | DG1 | UG1 | 1, 4, 5 | B | Scan:Disabled |
| 332 | D1 | U2 | DG1 | No User Group | 3, 4, 5 | A | Scan:Enabled |
| 333 | D1 | U3 | DG1 | No User Group | 4, 5 | A | Scan:Enabled |
| 334 | D2 | U1 | No Device Group | UG1 | 1, 5 | B | Scan:Disabled |
| 335 | D2 | U2 | No Device Group | No User Group | 3, 5 | A | Scan:Enabled |
| 336 | D2 | U3 | No Device Group | No User Group | 5 | B | Scan:Disabled |
| 337 | D3 | U1 | No Device Group | UG1 | 1, 2, 5 | B | Scan:Disabled |
| 338 | D3 | U2 | No Device Group | No User Group | 2, 3, 5 | B | Scan:Disabled |
| 339 | D3 | U3 | No Device Group | No User Group | 2, 5 | B | Scan:Disabled |

FIG. 3D

NOTE: S = SECURITY AGENT

ENDPOINT COMPUTER CONFIGURATION MANAGEMENT

TECHNICAL FIELD

The present disclosure relates generally to policy management and endpoint policy delivery. More specifically, the present disclosure describes a database-driven policy management architecture for grouping computer endpoints and to readily configure the grouped endpoints.

BACKGROUND

Large modern enterprises rely on computer networks comprising thousands, tens of thousands, or even hundreds of thousands of electronic devices, including endpoint computers, operated by millions of users. In doing so, large enterprises may rely on network administrators, cybersecurity teams, and the like to configure the devices for the implementation of security policies in a uniform manner. Such policies include a set of rules that establish a uniform manner in which the devices operate in a network. Traditional implementations typically include a configuration change, for example, policy settings, endpoint configuration data, etc., initiated by an administrator from a central location, e.g., network administrator, to all electronic devices connected to a network, which can cause a significant load on the network and require many hours or days to complete.

SUMMARY

According to embodiments, disclosed herein are a method and associated computer system and computer program product for policy management for enterprise endpoint computers. Stored at a database is a policy type having a plurality of device settings for a plurality of endpoint computers. A reference key is assigned to a device setting of the plurality of device settings, the reference key corresponding to a subset of endpoint computers of the plurality of endpoint computers. The subset of the endpoint computers is notified of the policy type. An endpoint computer of the subset of endpoint computers queries the database for a device setting of the plurality of device settings based on a current attribute of the endpoint computer. The device setting is fetched by the endpoint computer.

BRIEF DESCRIPTION OF THE DRAWINGS

The above and further advantages of the disclosed concepts and features may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

FIG. 2 depicts a method of configuration assignment and resolution, in accordance with an example embodiment.

FIG. 3A depicts a policy table configured by an administrator, in accordance with an example embodiment.

FIG. 3B depicts an assignment table corresponding to the database table of FIG. 3A, in accordance with an example embodiment.

FIG. 3C depicts a device setting storage table corresponding to the database table of FIG. 3A and the assignment table of FIG. 3B, in accordance with an example embodiment.

FIG. 3D depicts a table illustrating device policy resolution generated according to the stored assignment attributes and device settings illustrated in FIGS. 3A-3C.

DETAILED DESCRIPTION

Figure 1:
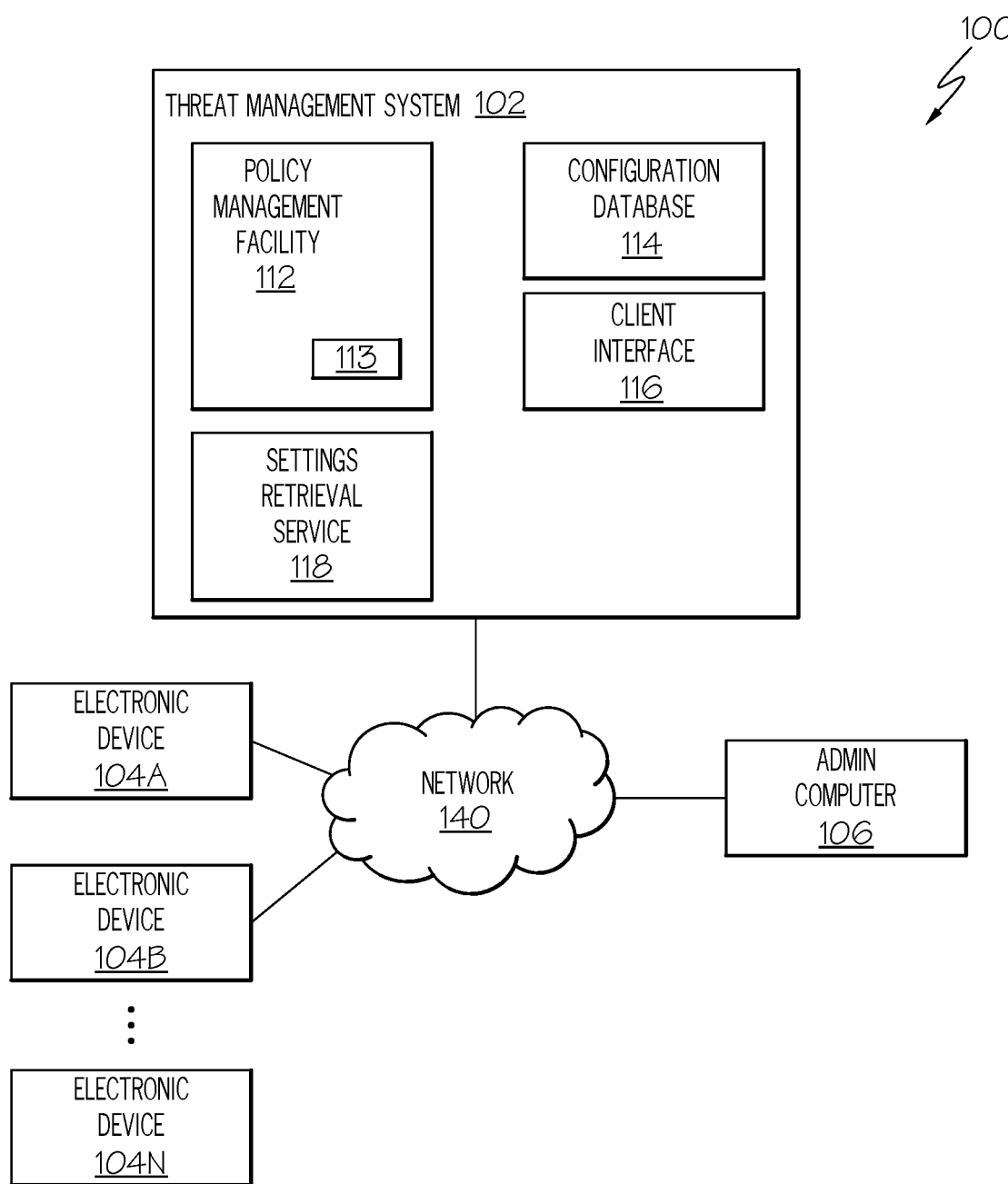
FIG. 1 depicts a configuration assignment and resolution architecture, in accordance with an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location unless a different meaning is explicitly provided or otherwise clear from the context.

In brief overview, embodiments herein are directed to systems and methods for storing endpoint computer configuration information, for example, device settings, to allow endpoint computers to efficiently query a database to resolve configuration changes to one or more endpoints, also referred to herein as devices, with minimal database queries. For example, a configuration assignment and resolution architecture can provide a resolution between device settings of a same policy type. A policy includes a set of options, and may include device settings for malware protection that can be applied by an administrator, e.g., network administrator, to users, devices, servers, or networks managed by the administrator. A policy can be assigned by the administrator to multiple users, or groups of users, or devices or groups of devices at once. In particular, policy data such as policy types and corresponding device settings can be arranged in a table or similar arrangement so that multiple sets of policy data can be defined in priority order for a computer network and applied to individual or groups of computer endpoints of the network managed by an administrator based on attributes of the devices or groups of devices in the network. In some embodiments, the system can have a persistent storage, e.g., storage volume such as a database, that stores structured information such as the device groups that each endpoint is a member of and to which an administrator has assigned one or more individual devices. The storage volume can also store the user identifications, and the user groups that each user is a member of. In some embodiments, an administrator can assign a user who is currently logged into a given device to a user group. Multiple sets of policy data, e.g., having policy types and corresponding device settings, may be stored in a database or the like in such a way that an endpoint can fetch its device settings efficiently at any given point in time based on the current attributes of the device, for example, version, anti-virus status, or operating system. This is an improvement over conventional policy management systems, where in response to a configuration setting change, a policy is rendered, or "pushed", to all relevant endpoints.

Referring now to the drawings, FIG. 1 depicts a configuration assignment and resolution architecture 100 according to an example embodiment. The configuration assignment and resolution architecture 100 includes a threat management facility 102 and a plurality of endpoint computers 104a-104n (generally, 104—also referred to as "endpoints" which can be categorized as electronic "devices"), where n is an integer greater than 1, connected to a network 140. The endpoints 104 connecting to the threat management facility 102 via the network 140 may be any type of electronic device known in the art, such as a personal computer, a laptop computer, a desktop computer, a surface computer, a mobile device, an internet of things (IoT) device, or the like monitored by the threat management facility 102. Aspects of the malicious code protection nay be provided, for example, in a security agent of an endpoint 104 as part of an application protection for communicating with the threat management facility 102. The endpoints 104 may execute a thread or the like for monitoring for policy changes so that a local policy cache can remain current with updates from the policy management facility 112.

The network 140 may be an enterprise system, client system or any other type of network which might be monitored by the threat management facility 102. Some or all of the threat management facility 102, endpoints 104, and network 140 may be similar to the threat management facility 700 shown in FIG. 7 and described below. The threat management facility 102 may be a computer system and/or cloud service system which is connectable to the network 140. The network 140 may be an enterprise facility having a network of endpoints, such as the network 754 shown in FIG. 7 and described below. The network 140 may be considered a customer, client, subscriber, or the like, of the services provided by the threat management facility 102.

The threat management facility 102 includes a policy management facility 112 having a policy delivery service 113, and further includes a configuration database 114, a client interface 116, and a settings retrieval service 118. Each of these services, individually or in any combination, may be provided by a computing system of the threat management facility 102, which may be physically hosted by an enterprise, hosted in a cloud-based computing environment, or some combination of these, and may be available to network administrators and other users through the client interface 116 or other web server interface.

The policy management facility 112 manages the rules or policies for the endpoints 104 such as access permissions, applications, compute instances, content, data, and the like. The policy delivery service 113 administers endpoint policy delivery to a computing environment requiring large load requirements, for example, including thousands, tens of thousands, or hundreds of thousands of devices under a central account managed by the configuration assignment and resolution architecture 100. In various embodiments, the policy delivery service 113 delivers settings to the endpoints 104, e.g., global settings, policy settings, endpoint settings, and so on. The policy delivery service 113 can arrange settings as "chunks" or a collection of settings that can be delivered to the endpoint together under a given policy type. The policy delivery service 113 can add, remove, or change setting to all chunks with the given policy type.

A persistent storage volume such as the configuration database 114 stores one or more tables, for example, shown in FIGS. 3A-3C. The configuration database 114 is structured, for example, as a structured query language (SQL), document store, key-value store, or the like so that it can be queried by an endpoint computer for a device setting according to a policy type for that endpoint computer. The database 114 permits data to be queried to resolve a configuration which applies to an endpoint computer at any given point in time based on the current attributes of the endpoint computer. In some embodiments, an endpoint 104 may request a policy, and, in response, be provided a choice between multiple settings, for example, a resolution between two device settings of the same policy type. In the disclosed embodiments, the database 114 is structured so that the endpoint 104 can query the database for any configuration that applies to the device, device group, user, or user group at the point of time when the query is performed.

The client interface 116 provides policy change information from a central administrator computer (not shown) or other remote computer to the policy delivery service 113. The central administrator computer can permit a user to manage and control security-related aspects of the computing environment including the endpoints 104, including the institution of policy changes. The central administrator computer via the client interface 116 can also modify and/or change a recommended action for security-related rules, which may require a modification to a computer setting, and instructions regarding the same can be delivered from the client interface 116 to the policy delivery service 113.

The settings retrieval service 118 communicates with the configuration database 114 to permit endpoints to retrieve policy information, and more specifically, settings. An endpoint 104 can retrieve a policy, or more specifically, a device setting of a policy, because the policy delivery service 114 can perform a lookup operation based on a combination of an endpoint identification (ID), a customer ID, and a user ID. A user ID may be assigned to a user and used to identify a user that has logged into a device. The customer ID may be used in a multi-tenanted system where the data of different customers is stored together. A customer ID is distinguished from an endpoint ID because a customer may have a license, ownership, etc. of multiple endpoints. For example, a customer may have a license for threat protection software that protects the customer's endpoints. In addition, a device group ID may be provided that identifies a group of endpoint devices (e.g., one or more endpoint devices). Here, since the endpoint is only aware of its customer ID and/or endpoint ID, the policy system can perform a lookup operation on the device group ID.

A central administrator computer 106 can be used to manage and control security-related aspects of the computing environment 100, including protecting the endpoints 104 against security-related threats. The central administrator computer 106 can also implement a policy change and in doing so can provide configuration change data for retrieval by the endpoints 104.

FIG. 2 depicts a method 200 of configuration assignment and resolution according to an example embodiment. The method 200 may be performed at the configuration assignment and resolution architecture 100 of FIG. 1 above, or a threat management facility 700, which is described with reference to FIG. 7 below.

At step 210, the policy delivery service 113 stores at the configuration database 114 at least one policy type having a plurality of device settings for a plurality of endpoints 104. Example policy types may include but not be limited to threat protection, peripheral control, application control, data loss prevention, web control, update management, and firewall protection. A policy type can identify the settings contained in a collection, or chunk, provided for an endpoint 104. A policy type can be associated with devices (or endpoints), users logged into devices, user groups, or device groups. The policy type can ensure that all managed endpoint computers 104 receive a policy administered by an administrator or other authority and reconfigure, upgrade, or otherwise modify its endpoint software according to a predetermined policy delivery technique, for example, described below.

At step 220, a reference key is assigned to a device setting. The reference key is a collection of settings that can be delivered to an endpoint computer together. The reference key is mapped to a policy type in a table stored in the database 114, for example, shown in FIG. 3B. In some embodiments, there is a mapping of settings, e.g., global settings, policy settings, endpoint-specific configuration settings, etc. to policy types to ensure that settings are only associated with a particular reference key. For example, referring to FIG. 3B, a device setting may have a policy value for enabling a real-time scan operation that is mapped to a threat protection policy type associated with a particular reference key. The endpoint computers 104 in a particular subset are identified by the reference key.

At step 230, the policy delivery service 113 notifies the subset of endpoint computers using the reference key of the policy type stored at the configuration database 114.

At step 240, an endpoint computer can query the database for a relevant setting. For example, a single computer may be used by two different users (e.g., an endpoint user and a network administrator). In this example, a policy can be implemented where an endpoint user cannot use Universal Serial Bus (USB) drives or related removable data storage devices. However, a network administrator is authorized for such use. When the network administrator logs onto the computer, the computer queries the database for the relevant setting regarding the use of USB drives, which may authorize the network administrator use of such USB drives. However, when an endpoint user logs into the same computer, the computer may query for the relevant setting relating to the use of USB drives, and retrieve a setting value that prohibits and/or prevents the endpoint user from using the USB drives associated with the endpoint computer. Thus, depending on the type of user using the endpoint computer, the user may or may not have access to particular hardware, software, or combinations thereof, on an endpoint computer.

Accordingly, at step 250, the endpoint device fetches the relevant device setting. The policy types described in step 210 may be broken out for large settings (e.g. exclusions, local sites) to minimize bandwidth because minimal database queries are required to implement a policy change since the configuration changes are stored in association with an attribute such as a device or device group, and endpoints 104 can fetch policy-related settings based on the current attributes of the device rather than an administrator changing a policy-related configuration on all endpoints at once.

FIGS. 3A-3C depict database tables 300, 310, 320 having a device setting storage arrangement, in accordance with an example embodiment. In particular, FIG. 3A depicts a policy table 300 illustrating a policy configured by an administrator, FIG. 3B depicts an assignment table 310, and FIG. 3C depicts a device setting storage table 320, in accordance with an example embodiment. Although three tables 300, 301, 302 are shown, the configuration database 114 can be constructed and arranged to store the contents in the fields shown in FIGS. 3A-3C in a single table or any file format.

The policies provided by an administrator may apply to a plurality of entities, in particular, devices (also referred to as endpoints) D1, D2, D3 and users U1, U2, U3, which can be arranged into a plurality of groups. In this example, device group DG1 corresponds to computer servers having high security features and includes device D1. User group UG1 is provided for administrators and includes user U1.

Referring to FIG. 3A, the policy table 300 includes a priority field 301, an assignment field 302, and a settings field 303. As shown, a first policy has a first priority (1) where real-time scanning is disabled (303) and applies to user group UG1 and device D3. A second policy establishes a second priority (2) wherein real-time scanning is enabled and applies to user U2 and device group DG1. A third policy establishes a third priority (3) wherein real-time scanning is disabled. Here, no entity or group assignments are provided.

Referring to FIG. 1, the contents of the policy table 300 configured by an administrator or the like can be provided by a client, e.g., the administrator computer 106 of FIG. 1, to the threat management system 102.

Referring to FIG. 3B, the assignment table 310 may be constructed and arranged to include a row column 311, a customer identification column 312, a device identification column 313, a device group identification column 314, a user identification column 315, and a user group identification column 316. Referring to the example above with respect to FIG. 3A, for a customer C1, rows 1 and 2 of the assignment table 310 identify user group UG1 and device D3, respectively, under the first priority (1). Rows 3 and 4 identify user U2 and device group DG1, respectively. When processing the contents of row 1 containing the group identification UG1, user U1 is the intended recipient. The user identifications U1, U2, U3 of each endpoint computer in the fields under the user identification 315 column, the user group identification (UG1) in the field under the group identification 316 column, the devices D1, D2, D3 under the device identification column 313, and device group (DG1) under the device group identification column 314 can be collectively referred to as assignment attributes. Accordingly, each row 311 includes a different assignment attribute (distinguished from device-specific attribute).

Each row in the assignment table 310 may also include a plurality of fields which may populate for each attribute, e.g., device 313, device group 314, user identification 315 or user group identification 316, a policy type 317, a priority 318, and a reference key 319. The policy type column 317 may have a plurality of device settings for a plurality of endpoint computers. A policy type may identify the settings contained under a reference key, examples of which are shown in a value field 322 in FIG. 3C, and which can be grouped according to a reference key 319 For example, the device setting value 322 in the device storage table 320 is assigned to the threat protection policy type 317. The policy management facility can generate a reference key 319 for the device setting(s) provided by the client. In the device setting storage table 312, each row can include the device setting 322 and the reference key 321, which may be similar to or the same as the reference key column 319 shown in FIG. 3B, assigned to the device setting 322.

Accordingly, the tables 300, 310, 320 are constructed and arranged for the policy management facility 112 so that an endpoint device 104 can resolve a configuration between device settings of the same policy type that applies to the device 104 at any given point in time based on the current attributes of the device, by querying for any configuration that applies to the device's group at that point in time. The device settings of the same policy type are arranged in the tables 300, 310, 320 so that the endpoint device 104 can fetch its device settings independently and efficiently at any given point in time, rather than the endpoint 104 being one of many endpoints receiving a device setting pushed from the policy management facility 112.

Referring to an example of a device policy resolution shown at row 331 of table 330 of FIG. 3D, a set of assignment attributes include a device identification D1, user identification U1, device group identification DG1, and user group identification UG1. Referring to the assignment table 310, rows 1, 4, and 5 include at least one of these attributes. In particular, row 1 includes user group identification UG1, row 4 includes device group identification DG1, and row 5 applies because there are no specific attributes identified. Also displayed in row 331 is a reference key value (B) and corresponding device setting value 322 in the device storage table 320 is assigned to the threat protection policy type 317 pertaining to a policy where real-time scanning is disabled for the attributes under row 331, e.g., D1, U1, DG1, and/or UG1. In resolving which row 1, 4, or 5 of assignment table 310 should be applied, the priority value 318 is considered. In this example, row 1 has a higher priority (1) than rows 4 or 5. Therefore, the device setting under row 1 is applied to device D1 based on the current attributes of the device.

In another example shown at row 332 of table 330 of FIG. 3D, a set of assignment attributes include a device identification D1, user identification U2, device group identification DG1, and no user group identification. Here, rows 3, 4, and 5 of the assignments table 310 include at least one of these attributes. In particular, row 3 includes user identification U2, row 4 includes device group identification DG1, and row 5 applies because there are no specific attributes identified. Also displayed in row 332 is a reference key value (A) and corresponding device setting value 322 in the device storage table 320 is assigned to the threat protection policy type 317 pertaining to a policy where real-time scanning is enabled for the attributes under row 332, e.g., D1, U2, and/or DG1. In resolving which row 3, 4, or 5 of assignment table 310 should be applied, the priority value 318 is considered. In this example, rows 3 and 4 have a higher priority (2) than row 5 (priority (3)). Therefore, the device setting under rows 3 and 4 where real-time scanning is enabled may be applied to device D1 since user U2 is the current user of device D1. Accordingly, device D1 may be configured with one setting, i.e., enable scan, when user U2 uses the device D1 and configured with another setting, i.e., disable scan, when user U1 uses the device D1.

In another example shown at row 333 of table 330 of FIG. 3D, a set of assignment attributes include a device identification D1, user identification U3, device group identification DG1, and no user group identification. Here, rows 4 and 5 of the assignments table 310 include at least one of these attributes. Also displayed in row 333 is a reference key value (A) and corresponding device setting value 322 pertaining to a policy where real-time scanning is enabled for the attributes under row 333. Therefore, one difference between the device policy resolution rows 331 and 333 is that different users use the same device at different times, resulting in different settings, i.e., disabled for user U1 and enabled for user U3. Although user U3 is not identified under rows 4 and 5 under user identification column 315, device D1 is part of the device group DG1, which is identified in row 4. Therefore, the device setting under row 4 where real-time scanning is enabled may be applied to device D1 since user U3 is the current user of device D1.

In another example shown at row 334 of table 330 of FIG. 3D, a different device D2 is considered. Other assignment attributes include a user identification U1, no device group identification, and user group identification UG1. Here, rows 1 and 5 of the assignments table 310 include at least one of these attributes. Also displayed in row 334 is a reference key value (B) and corresponding device setting value 322 pertaining to a policy where real-time scanning is disabled for the attributes under row 334. Here, the priority (1) in row 1 is higher than that in row 5. Also, user U1 and user group UG1 which includes user U1 are the identified attributes. Therefore, the device setting under row 1 where real-time scanning is disabled may be is applied to device D2 since user U1 is the current user of device D2.

In another example shown at row 335 of table 330 of FIG. 3D, assignment attributes include a user identification U2 and no device group identification or user group identification. Here, rows 3 and 5 of the assignments table 310 include at least one of these attributes. Also displayed in row 335 is a reference key value (A) and corresponding device setting value 322 pertaining to a policy where real-time scanning is enabled for the attributes under row 335. Here, the priority (2) in row 3 is higher than that in row 5. Also, user U2 is the identified attribute in row 3. Therefore, the device setting under row 3 where real-time scanning is enabled is applied to device D2.

In another example shown at row 336 of table 330 of FIG. 3D, a different device D2 is considered. Other assignment attributes include a user identification U3 and no device group identification or user group identification. Here, row 5 of the assignments table 310 includes at least one of these attributes and is the only matching row so the priority is not considered. Also displayed in row 336 is a reference key value (B) and corresponding device setting value 322 pertaining to a policy where real-time scanning is disabled for device D2 when user U3 uses the device D2.

In another example shown at row 337 of table 330 of FIG. 3D, device D3 is subject to configuration conflict resolution. Other assignment attributes are similar to those under row 334, namely, include a user identification U1, no device group identification, and user group identification UG1. However, in row 337, rows 1, 2, and 5 apply, since D3 is identified under the device identification column 313 in the assignment table 310. Rows 1 and 2 include a higher priority (1) than row 5 (priority (3)). However, both rows 1 and 2 include a reference key value (B) and corresponding device setting value 322 pertaining to a policy where real-time scanning is disabled for the attributes under row 337. Accordingly, device D3 may be configured with one setting, i.e., disable scan, when user U1 uses the device D3. In other examples shown in rows 338 and 339, the disabled scan setting is applied to the device D3 for similar reasons as those described with respect to the example shown in row 337.

Figure 4:
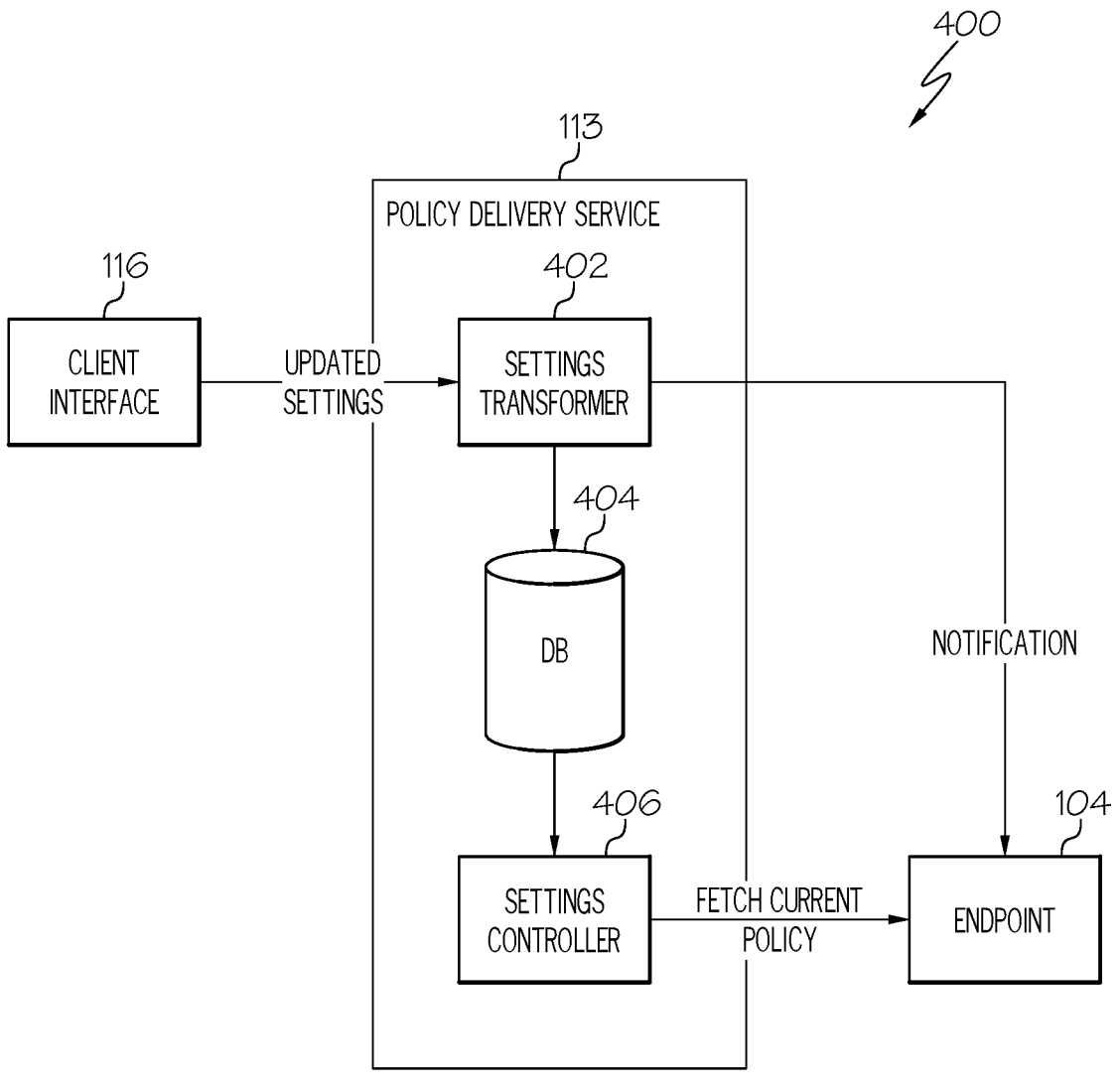
FIG. 4 depicts a configuration assignment and resolution architecture illustrating data flows between a policy delivery service and an endpoint of FIG. 1, in accordance with an example embodiment.

FIG. 4 depicts a configuration assignment and resolution architecture 400 illustrating data flows between a policy delivery service 113 and an endpoint 104 of FIG. 1, in accordance with an example embodiment.

In the architecture 400, the policy delivery service 113 includes a settings transformer 402, a database 404, and a settings controller 406.

In some embodiments, the settings transformer 402 is a software module that receives updated device settings from the client interface 116 for configuring one or more endpoints 104 in communication with the policy delivery service 113. The settings transformer 402 can store the updated device settings at the database 404. The database 404 may be the same as or similar to the configuration database 114 in FIG. 1 so details are not repeated for brevity. For example, the updated device settings provided by the client interface 116 may include policy change information from a central administrator computer. In some embodiments, the policy change information may include updated settings generated by an actor model, microservice or related service-oriented architecture (SOA) agent and provided to the client interface 116.

The settings transformer 402 also generates, in response to the updated settings, a notification for the endpoint 104 to fetch the updated device settings for the current policy that includes the updated settings. In some embodiments, the settings controller 406 includes a software module that retrieves the settings from the database 404 and communicates with the endpoint 104 for fetching the updated endpoint settings for the current policy to the endpoint 104 according to the notification received by the endpoint 104 from the settings transformer 402.

The database 404 stores the settings in such a way that a given endpoint can retrieve its settings via the settings controller 404 efficiently rather than the policy delivery service 113 calculating and storing the settings for every endpoint. This minimizes the upfront work done when settings change, and avoids doing any work for endpoints that may be offline or not in communication with an administrator. When the endpoint 104 comes online, for example, at the start of a workday, the settings have already been pushed to the policy delivery service 113 for retrieval.

During operation, a client, e.g., the administrator computer 106 of FIG. 1, pushes device settings of relevant policy types to the policy delivery service 113. In doing so, the client provides the identifications that the settings apply to, e.g., reference keys. Therefore, when an endpoint 104 requests its policy, it can look up a reference key based on the properties, such as global properties that apply to all endpoints, customer properties that applies to endpoints based on their associated customer, endpoint properties that apply to endpoints based on their identifier, and policy properties that apply to endpoints based on any of their endpoint ID, device group id, user id or user group id. When the settings are received by the policy delivery service 113, it provides the identification(s) and reference key that the settings apply to. Therefore, when an endpoint requests its policy, it looks up the reference keys based on the above properties. The endpoint 104 is only aware of its customer ID and endpoint ID. Therefore, the policy delivery service 113 will need to perform a lookup operation of the database for the device group ID, user ID and/or user group ID based on these properties. The database 404 will have a persistent store of the device groups that each endpoint is a member of. In some embodiments, the database 404 may store the the user ID that each login string maps to and the user groups that each user is a member of. In some embodiments, as shown in FIG. 3, the persistent stores are therefore limited to the users and groups that are assigned to a reference key.

Figure 5:
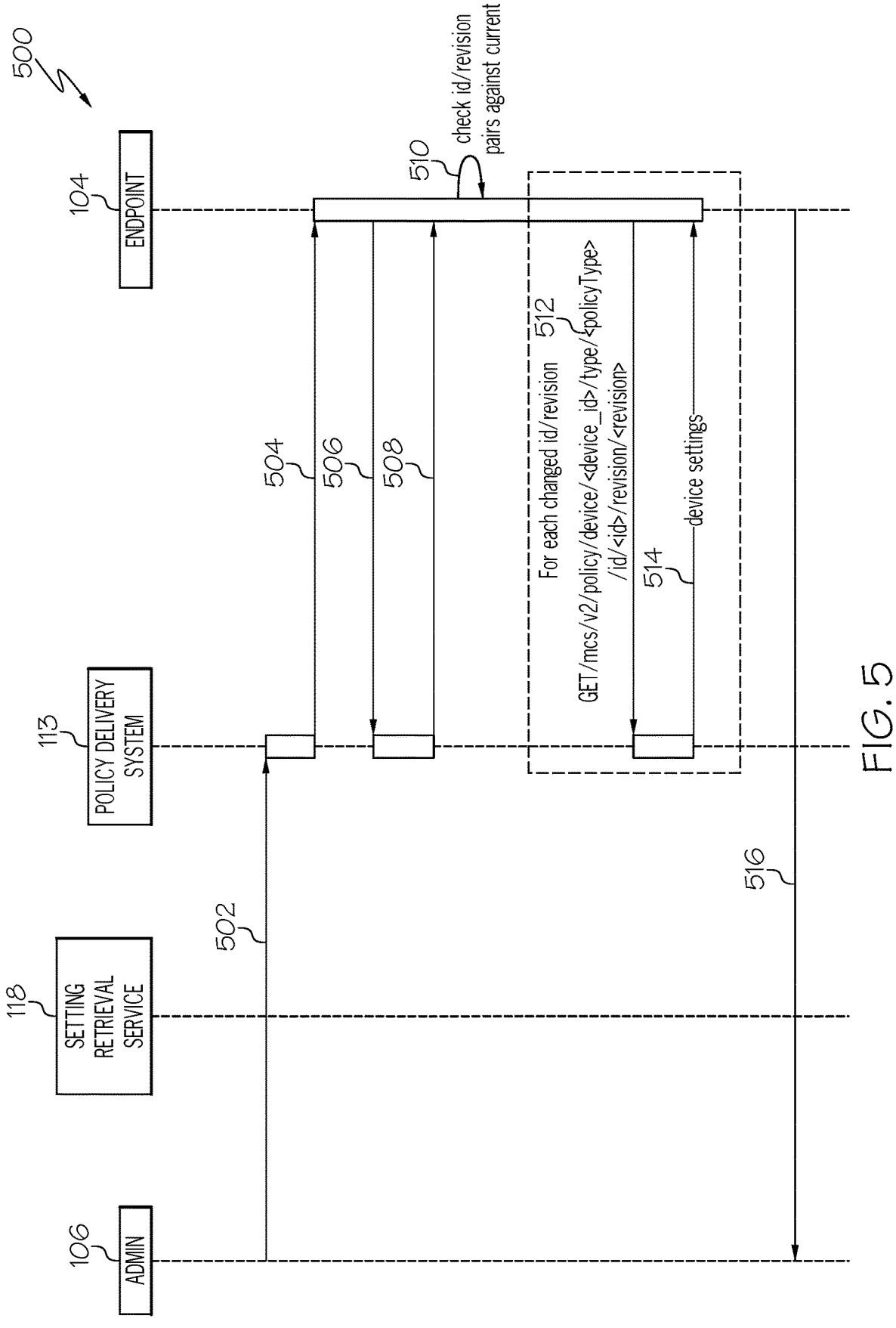
FIG. 5 depicts an environment for policy management, in accordance with an example embodiment.

FIG. 5 depicts an environment 500 for policy management, which includes an electronic communication between the policy delivery service 113 and endpoint 104 of FIGS. 1 and 4, in accordance with an example embodiment. The sequence diagram 500 may include one or more computer systems and/or processors of the configuration assignment and resolution architecture 100 of FIG. 1 above, or threat management facility 700 of FIG. 7 below.

During operation, a policy change notification may be provided (502) from an administrator computer 106 via the client interface 116 to the policy delivery service 113. The policy delivery service 113, in turn, notifies (504) the endpoint 104 of the policy change. In some embodiments, in lieu of steps 502 and 504, the endpoint 104 may instead determine that a policy should be re-evaluated.

The endpoint 104 requests (506) a policy. In some embodiments, the endpoint 104 must be authenticated, e.g., logged into the threat management system 102. In response, the policy delivery service 113 returns (508) a collection of settings, such as reference keys that apply to the endpoint that represent the policy. These settings can be identified by a reference key, for example, reference key 319, 321 shown in FIG. 3. The endpoint 104 evaluates (510) each policy type against its own stored id and revision. The endpoint 104 requests (512) a reference key from the list provided at step 508. The policy delivery service 113 returns (514) the reference key details for the given policy type, ID, and revision. Steps 512 and 514 are performed for each changed ID or revision. The endpoint 104 sends (516) a message to the administrator computer 116 with details on the policies that were applied.

Figure 6:
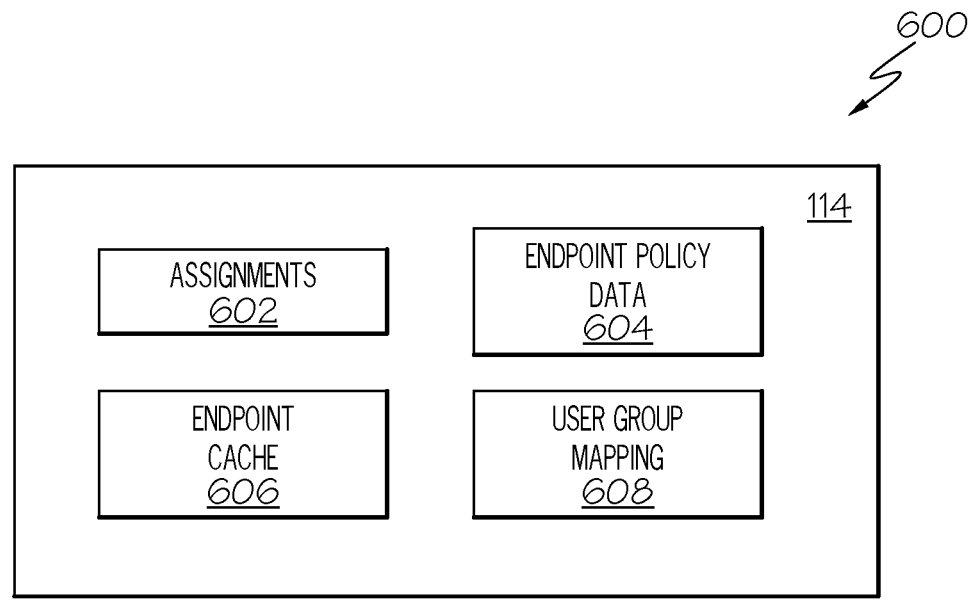
FIG. 6 depicts an entity relationship diagram, in accordance with an example embodiment.

FIG. 6 depicts an entity relationship diagram 600 of a database configuration, in accordance with an example embodiment. In some embodiments, the database configuration of FIG. 6 can be provided by the configuration database 114 described herein. The entity relationship diagram illustrates the data that may be stored to apply one or more settings to endpoint devices managed by an organization and/or in communication with the policy delivery service 113.

The entity relationship diagram 600 can include an assignments storage component 602, a device settings storage component 604, an endpoint cache 606, and a user group mapping storage component 608 that are implemented as software storage elements of the configuration database 114. In some embodiments, one or more of the assignments storage component 602, the device settings storage component 604, the endpoint cache 606, and the user group mapping storage component 608 are implemented in a structured query language (SQL) or key-value storage format so that the objects, settings, endpoint attributes, and mapping data (described below) can be arranged in the database 114 for querying and retrieval by an endpoint computer according to the method 200 of FIG. 2.

The assignments storage component 602 includes a mapping of objects, e.g., endpoint id, device group id, user id, or user group id described above to policy objects for lookup purposes.

The device settings storage component 604 stores settings corresponding to a given reference key, for example, shown in FIG. 3C As described above, a reference key is a collection of settings that should be delivered to the endpoint together, where each reference key can represent a policy type, as described above. There must only be one reference key for each policy type. More specifically, when a device resolves its policy there must only be one reference key of each policy type.

The endpoint cache 606 stores endpoint details required to find the correct settings to deliver to a given endpoint.

Figure 7:
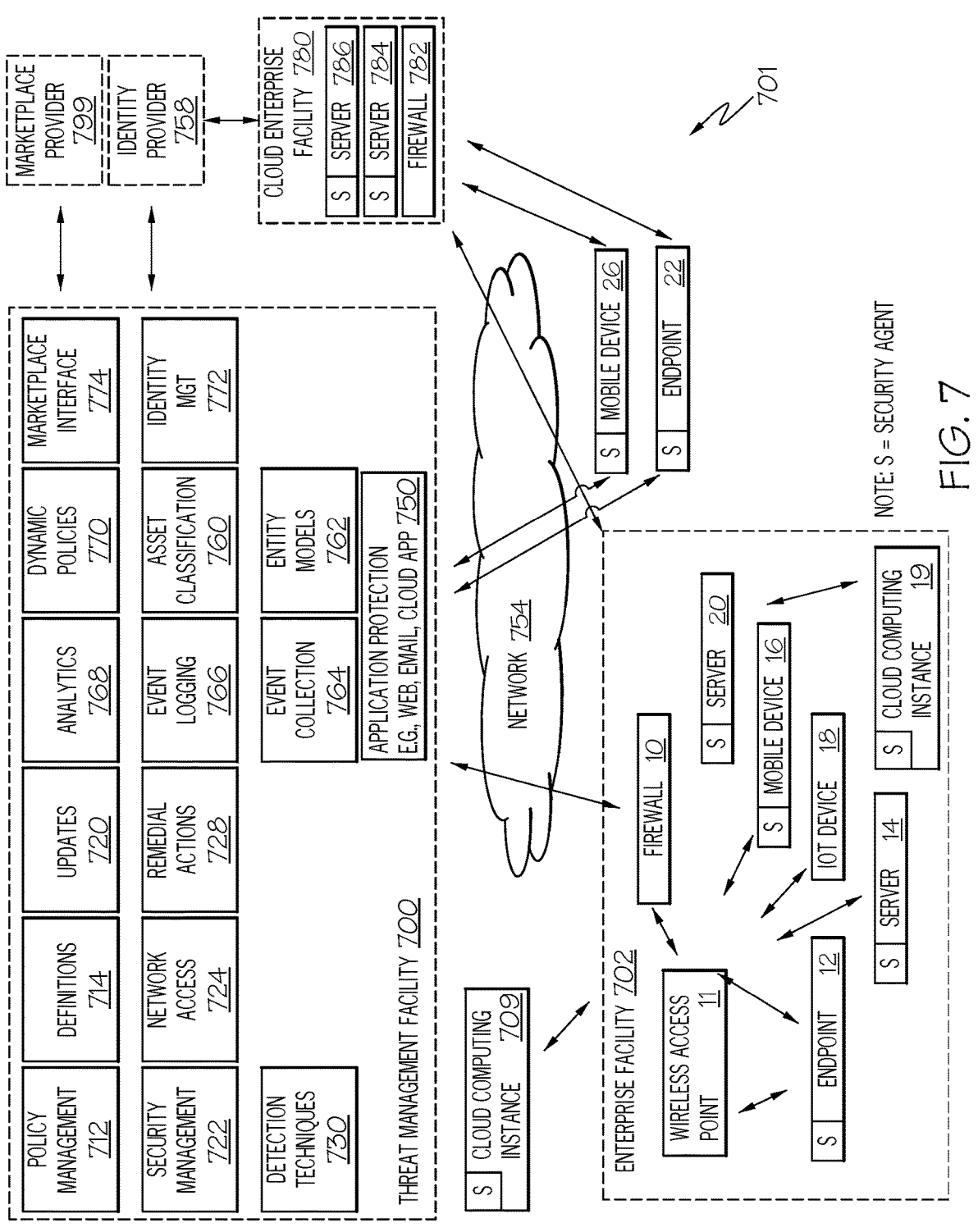
FIG. 7 depicts a block diagram of a threat management facility, in accordance with an example embodiment.

FIG. 7 depicts a block diagram of a threat management facility 700 providing protection against a plurality of threats, such as malware, viruses, spyware, cryptoware, adware, Trojans, spam, intrusion, policy abuse, improper configuration, vulnerabilities, improper access, uncontrolled access, code injection attacks and more according to an example embodiment. The threat management facility 700 may be used for performing configuration assignment and resolution operations in accordance with the method 200 of FIG. 2. Accordingly, elements of the threat management facility 700 may be similar to or the same as the configuration assignment and resolution architecture 100 of FIG. 1. In particular, the threat management facility 700 includes endpoints 12, 22 (described below) that may be similar to or the same as the endpoints 104 of the configuration assignment and resolution architecture 100. In addition, the threat management facility 700 may include the policy management facility 112 of FIG. 1. In doing so, the threat management facility 700 may include or otherwise communicate with the configuration database 114 and client interface 116 of FIG. 1.

The threat management facility 700 may communicate with, coordinate, and control operation of security functionality at different control points, layers, and levels within the facility 700. A number of capabilities may be provided by the threat management facility 700, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats or unwanted activity. In embodiments, the threat management facility 700 may provide protection from a variety of threats or unwanted activity to an enterprise facility that may include a variety of compute instances in a variety of locations and network configurations.

Just as one example, users of the threat management facility 700 may define and enforce policies that control access to and use of compute instances, networks and data. Administrators may update policies such as by designating authorized users and conditions for use and access. The threat management facility 700 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 700 may provide many different services, and policy management may be offered as one of the services.

Turning to a description of certain capabilities and components of the threat management facility 700, an exemplary enterprise facility 702 may be or may include any networked computer-based infrastructure. For example, the enterprise facility 702 may be corporate, commercial, organizational, educational, governmental, or the like. As home networks get more complicated and include more compute instances at home and in the cloud, an enterprise facility 702 may also or instead include a personal network such as a home or a group of homes. The enterprise facility's 702 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instance, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or type of compute instances 10-20 in a given enterprise facility. For example, in addition to the elements depicted in the enterprise facility 702, there may be one or more gateways, bridges, wired networks, wireless networks, virtual private networks, other compute instances, and so on.

The threat management facility 700 may include certain facilities, such as a policy management facility 712, security management facility 722, update facility 720, definitions facility 714, network access rules facility 724, remedial action facility 728, detection techniques facility 730, application protection facility 750, asset classification facility 760, entity model facility 762, event collection facility 764, event logging facility 766, analytics facility 768, dynamic policies facility 770, identity management facility 772, and marketplace management facility 774, as well as other facilities. For example, there may be a testing facility, a threat research facility, and other facilities. It should be understood that the threat management facility 700 may be implemented in whole or in part on a number of different compute instances, with some parts of the threat management facility on different compute instances in different locations. For example, some or all of one or more of the various facilities 700, 712-774 may be provided as part of a security agent S that is included in software running on a compute instance 10-26 within the enterprise facility. Some or all of one or more of the facilities 700, 712-774 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 709.

In embodiments, a marketplace provider 799 may make available one or more additional facilities to the enterprise facility 702 via the threat management facility 700. The marketplace provider may communicate with the threat management facility 700 via the marketplace interface facility 774 to provide additional functionality or capabilities to the threat management facility 700 and compute instances 10-26. A marketplace provider 799 may be selected from a number of providers in a marketplace of providers that are available for integration or collaboration via the marketplace interface facility 774. A given marketplace provider 799 may use the marketplace interface facility 774 even if not engaged or enabled from or in a marketplace. As non-limiting examples, the marketplace provider 799 may be a third-party information provider, such as a physical security event provider; the marketplace provider 799 may be a system provider, such as a human resources system provider or a fraud detection system provider; the marketplace provider 799 may be a specialized analytics provider; and so on. The marketplace provider 799, with appropriate permissions and authorization, may receive and send events, observations, inferences, controls, convictions, policy violations, or other information to the threat management facility. For example, the marketplace provider 799 may subscribe to and receive certain events, and in response, based on the received events and other events available to the marketplace provider 799, send inferences to the marketplace interface, and in turn to the analytics facility 768, which in turn may be used by the security management facility 722.

The identity provider 758 may be any remote identity management system or the like configured to communicate with an identity management facility 772, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 758 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 772 may communicate hygiene, or security risk information, to the identity provider 758. The identity management facility 772 may determine a risk score for a user based on the events, observations, and inferences about that user and the compute instances associated with the user. If a user is perceived as risky, the identity management facility 772 can inform the identity provider 758, and the identity provider 758 may take steps to address the potential risk, such as to confirm the identity of the user, confirm that the user has approved the SaaS application access, remediate the user's system, or such other steps as may be useful.

In embodiments, threat protection provided by the threat management facility 700 may extend beyond the network boundaries of the enterprise facility 702 to include clients (or client facilities) such as an endpoint 22 outside the enterprise facility 702, a mobile device 26, a cloud computing instance 709, or any other devices, services or the like that use network connectivity not directly associated with or controlled by the enterprise facility 702, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 702 network, such as when compute instances 22, 26 use a network that is outside of the enterprise facility 702 and separated from the enterprise facility 702, e.g., by a gateway, a public network, and so forth.

In some implementations, compute instances 10-26 may communicate with a cloud enterprise facility 780. The cloud enterprise facility may include one or more cloud applications, such as a SaaS application, which is used by but not operated by the enterprise facility 702. Exemplary commercially available SaaS applications include Salesforce, Amazon Web Services (AWS) applications, Google Apps applications, Microsoft Office 365 applications and so on. A given SaaS application may communicate with an identity provider 758 to verify user identity consistent with the requirements of the enterprise facility 702. The compute instances 10-26 may communicate with an unprotected server (not shown) such as a web site or a third-party application through an internetwork 754 such as the Internet or any other public network, private network or combination of these.

The cloud enterprise facility 780 may include servers 784, 786, and a firewall 782. The servers 784, 786 on the cloud enterprise facility 780 may run one or more enterprise or cloud applications, such as SaaS applications, and make them available to the enterprise facilities 702 compute instances 10-26. It should be understood that there may be any number of servers 784, 786 and firewalls 782, as well as other compute instances in a given cloud enterprise facility 780. It also should be understood that a given enterprise facility may use both SaaS applications and cloud enterprise facilities 780, or, for example, a SaaS application may be deployed on a cloud enterprise facility 780.

In embodiments, aspects of the threat management facility 700 may be provided as a stand-alone solution. In other embodiments, aspects of the threat management facility 700 may be integrated into a third-party product. An application programming interface (e.g., a source code interface) may be provided such that aspects of the threat management facility 700 may be integrated into or used by or with other applications. For instance, the threat management facility 700 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 700 through the third-party product.

The security management facility 722 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 722 may provide malicious code protection to a compute instance. The security management facility 722 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 750 provided by the cloud, and so on.

In an embodiment, the security management facility 722 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 750 provided by the cloud, and so on.

In an embodiment, security management facility 722 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 750 provided by the cloud, and so on.

In an embodiment, the security management facility 722 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 750 provided by the cloud, e.g., from the threat management facility 700 or other network resource(s).

In an embodiment, the security management facility 722 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 750 provided by the cloud, and so on.

In an embodiment, the security management facility 722 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 700. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 750 provided by the cloud, and so on. In embodiments, some reputation information may be stored on a compute instance 10-26, and other reputation data available through cloud lookups to an application protection lookup database, such as may be provided by application protection 750.

In embodiments, information may be sent from the enterprise facility 702 to a third party, such as a security vendor, or the like, which may lead to improved performance of the threat management facility 700. In general, feedback may be useful for any aspect of threat detection. For example, the types, times, and number of virus interactions that an enterprise facility 702 experiences may provide useful information for the prevention of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 720 may provide control over when updates are performed. The updates may be automatically transmitted, manually transmitted, or some combination of these. Updates may include software, definitions, reputations or other code or data that may be useful to the various facilities. For example, the update facility 720 may manage receiving updates from a provider, distribution of updates to enterprise facility 702 networks and compute instances, or the like. In embodiments, updates may be provided to the enterprise facility's 702 network, where one or more compute instances on the enterprise facility's 702 network may distribute updates to other compute instances.

The threat management facility 700 may include a policy management facility 712 that manages rules or policies for the enterprise facility 702. Exemplary rules include access permissions associated with networks, applications, compute instances, users, content, data, and the like. The policy management facility 712 may use a database, a text file, other data store, or a combination to store policies. In an embodiment, a policy database may include a block list, a blacklist, an allowed list, a whitelist, and more. As a few non-limiting examples, policies may include a list of enterprise facility 702 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 722 may access the rules within a policy facility to determine if the requested access is related to a sporting website.

The policy management facility 712 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 700, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 712 may be a stand-alone application, may be part of the network server facility 742, may be part of the enterprise facility 702 network, may be part of the client facility, or any suitable combination of these.

The policy management facility 712 may include dynamic policies that use contextual or other information to make security decisions. As described herein, the dynamic policies facility 770 may generate policies dynamically based on observations and inferences made by the analytics facility. The dynamic policies generated by the dynamic policy facility 770 may be provided by the policy management facility 712 to the security management facility 722 for enforcement.

In embodiments, the threat management facility 700 may provide configuration management as an aspect of the policy management facility 712, the security management facility 722, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 712 may require a configuration that turns off USB drive access via a registry key of a compute instance. Aspects of configuration management may be provided, for example, in the security agent of an endpoint 12, in a wireless access point 11 or firewall 10, as part of application protection 750 provided by the cloud, or any combination of these.

In embodiments, the threat management facility 700 may also provide for the isolation or removal of certain applications that are not desired or may interfere with the operation of a compute instance 10-26 or the threat management facility 700, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 712 may also require update management (e.g., as provided by the update facility 720). Update management for the security facility 722 and policy management facility 712 may be provided directly by the threat management facility 700, or, for example, by a hosted system. In embodiments, the threat management facility 700 may also provide for patch management, where a patch may be an update to an operating system, an application, a system tool, or the like, where one of the reasons for the patch is to reduce vulnerability to threats.

In embodiments, the security facility 722 and policy management facility 712 may push information to the enterprise facility 702 network and/or the compute instances 10-26, the enterprise facility 702 network and/or compute instances 10-26 may pull information from the security facility 722 and policy management facility 712, or there may be a combination of pushing and pulling of information. For example, the enterprise facility 702 network and/or compute instances 10-26 may pull update information from the security facility 722 and policy management facility 712 via the update facility 720, an update request may be based on a time period, by a certain time, by a date, on demand, or the like. In another example, the security facility 722 and policy management facility 712 may push the information to the enterprise facility's 702 network and/or compute instances 10-26 by providing notification that there are updates available for download and/or transmitting the information. In an embodiment, the policy management facility 712 and the security facility 722 may work in concert with the update management facility 720 to provide information to the enterprise facility's 702 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 714 of the threat management facility 700 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 700 and the compute instances 10-26 may be provided with new definitions periodically to include most recent threats. Updating of definitions may be managed by the update facility 720, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 700 in light of continuous generation of new or evolved forms of malware. Threat research may be provided by researchers and analysts working on known threats, in the form of policies, definitions, remedial actions, and so on.

The security management facility 722 may scan an outgoing file and verify that the outgoing file is permitted to be transmitted according to policies. By checking outgoing files, the security management facility 722 may be able discover threats that were not detected on one of the compute instances 10-26, or policy violation, such transmittal of information that should not be communicated unencrypted.

The threat management facility 700 may control access to the enterprise facility 702 networks. A network access facility 724 may restrict access to certain applications, networks, files, printers, servers, databases, and so on. In addition, the network access facility 724 may restrict user access under certain conditions, such as the user's location, usage history, need to know, job position, connection type, time of day, method of authentication, client-system configuration, or the like. Network access policies may be provided by the policy management facility 712, and may be developed by the enterprise facility 702, or pre-packaged by a supplier. Network access facility 724 may determine if a given compute instance 10-22 should be granted access to a requested network location, e.g., inside or outside of the enterprise facility 702. Network access facility 724 may determine if a compute instance 22, 26 such as a device outside the enterprise facility 702 may access the enterprise facility 702. For example, in some cases, the policies may require that when certain policy violations are detected, certain network access is denied. The network access facility 724 may communicate remedial actions that are necessary or helpful to bring a device back into compliance with policy as described below with respect to the remedial action facility 728. Aspects of the network access facility 724 may be provided, for example, in the security agent of the endpoint 12, in a wireless access point 11, in a firewall 10, as part of application protection 750 provided by the cloud, and so on.

In an embodiment, the network access facility 724 may have access to policies that include one or more of a block list, a blacklist, an allowed list, a whitelist, an unacceptable network site database, an acceptable network site database, a network site reputation database, or the like of network access locations that may or may not be accessed by the client facility. Additionally, the network access facility 724 may use rule evaluation to parse network access requests and apply policies. The network access rule facility 724 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 700 may include an asset classification facility 760. The asset classification facility will discover the assets present in the enterprise facility 702. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 762. The entity models may be used, for example, to determine the events that are generated by assets. For example, some operating systems may provide useful information for detecting or identifying events. For example, operating systems may provide process and usage information that is accessed through an API. As another example, it may be possible to instrument certain containers to monitor the activity of applications running on them. As another example, entity models for users may define roles, groups, permitted activities and other attributes.

The event collection facility 764 may be used to collect events from any of a wide variety of sensors that may provide relevant events from an asset, such as sensors on any of the compute instances 10-26, the application protection facility 750, a cloud computing instance 709 and so on. The events that may be collected may be determined by the entity models. There may be a variety of events collected. Events may include, for example, events generated by the enterprise facility 702 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 709. Events may range in granularity. An exemplary event may be communication of a specific packet over the network. Another exemplary event may be the identification of an application that is communicating over a network.

The event logging facility 766 may be used to store events collected by the event collection facility 764. The event logging facility 766 may store collected events so that they can be accessed and analyzed by the analytics facility 768. Some events may be collected locally, and some events may be communicated to an event store in a central location or cloud facility. Events may be logged in any suitable format.

Events collected by the event logging facility 766 may be used by the analytics facility 768 to make inferences and observations about the events. These observations and inferences may be used as part of policies enforced by the security management facility. Observations or inferences about events may also be logged by the event logging facility 766.

When a threat or other policy violation is detected by the security management facility 722, the remedial action facility 728 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 722 may take any steps or deploy any measures suitable for addressing a detection of a threat, potential threat, policy violation or other event, code or activity that might compromise security of a computing instance 10-26 or the enterprise facility 702.

While the above description of the threat management facility 700 describes various threats typically coming from a source outside the enterprise facility 702, it should be understood that the disclosed embodiments contemplate that threats may occur to the enterprise facility 702 by the direct actions, either intentional or unintentional, of a user or employee associated with the enterprise facility 702. Thus, reference to threats hereinabove may also refer to instances where a user or employee, either knowingly or unknowingly, performs data exfiltration from the enterprise facility 702 in a manner that the enterprise facility 702 wishes to prevent.

Figure 8:
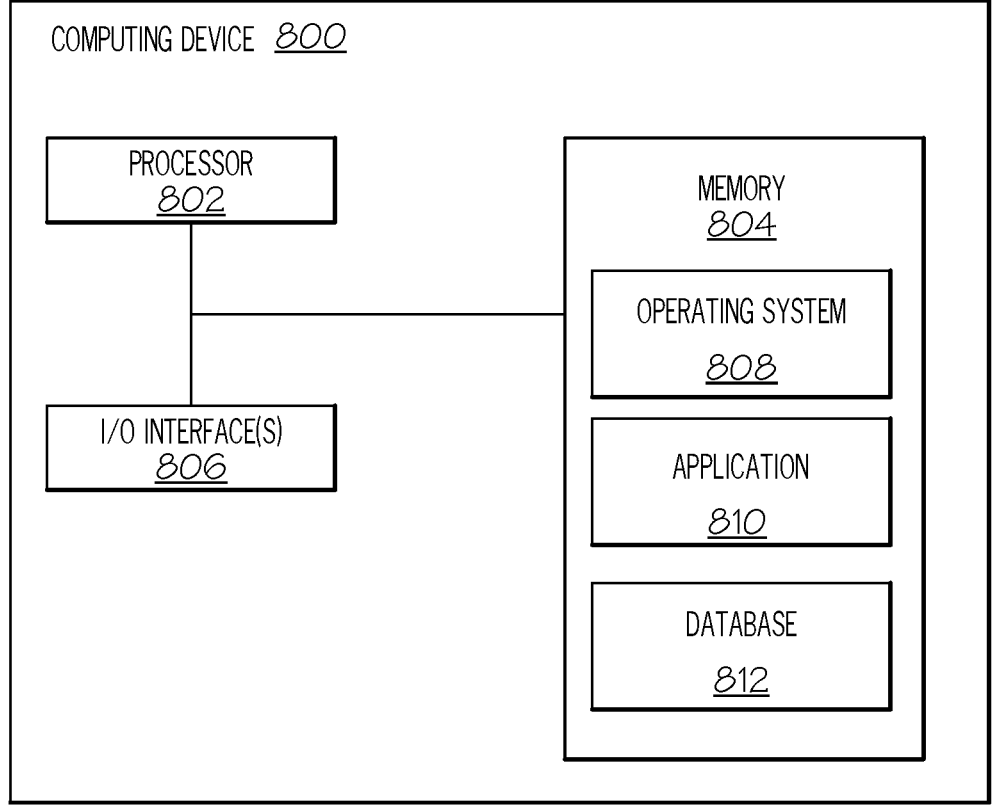
FIG. 8 depicts a diagram of a computing device, in accordance with an example embodiment.

FIG. 8 is a diagram of an example computing device 800, according to an example embodiment. As shown, the computing device 800 includes one or more processors 802, non-transitory computer readable medium or memory 804, I/O interface devices 806 (e.g., wireless communications, etc.) and a network interface 808. The computer readable medium 804 may include an operating system 808, an application 810 for configuration assignment and resolution, and a database 812 in accordance with the systems and methods described herein.

In operation, the processor 802 may execute the application 810 stored in the computer readable medium 804. The application 810 may include software instructions that, when executed by the processor, cause the processor to perform operations for configuration assignment and resolution, as described and shown in FIGS. 1-6, with particular reference to the steps of the methodology shown in FIGS. 2, 4, and 5. The database 812 is constructed and arranged to store a plurality of database tables, for example, tables 300-330 described with reference to FIGS. 3A-3D, or the assignments storage component 602, device settings storage component 604, endpoint cache 606, and user group mapping storage component 608 of the entity relationship diagram 600 of FIG.

The application program 810 may operate in conjunction with the database 812 and the operating system 808. The device 800 may communicate with other devices (e.g., a wireless access point) via the I/O interface 806.

Although the foregoing Figures illustrate various embodiments of the disclosed systems and methods, additional and/or alternative embodiments are contemplated as falling within the scope of this disclosure. For example, in one embodiment, this disclosure provides for a method of policy management for enterprise endpoint computers, comprising: storing, at a database by one or more processors of a policy delivery system, a policy type having a plurality of device settings for a plurality of endpoint computers; assigning, by the one or more processors of the policy delivery system, a reference key to a device setting of the plurality of device settings, the reference key corresponding to a subset of endpoint computers of the plurality of endpoint computers; notifying, by the one or more processors of the policy delivery system, the subset of the endpoint computers of the policy type; querying, by an endpoint computer of the subset of the endpoint computers, the database for a device setting of the plurality of device settings based on a current attribute of the endpoint computer; and fetching, by the endpoint computer, the device setting.

In another embodiment, the device setting to which the reference key is assigned includes a first configuration value mapped to one or more individual endpoint computers of the plurality of endpoint computers and a second configuration value mapped to a group identification that includes the subset of endpoint computers.

In another embodiment, the current attribute of the endpoint computer is time-dependent, and wherein the endpoint computer fetches the device setting having the first configuration value at a first point in time of the current attribute and fetches the device setting having the second configuration value at a second point in time of the current attribute.

In another embodiment, the method further comprises storing at the database a table generated by the one or more processors, wherein the table includes a plurality of rows, and wherein a row of the plurality of rows includes the device setting and the reference key assigned to the device setting; and querying, by the endpoint computer, the table for the device setting.

In another embodiment, the method further comprises storing at the database a plurality of assignment attributes, including an identification of each endpoint computer and a group identification of each of one or more groups of endpoint computers, wherein a group identification includes an identification of the subset of endpoint computers, and wherein each row of the table includes a different assignment attribute.

In another embodiment, the row of the table includes a priority value for each device setting, which is arranged in the table according to the priority value, and wherein the querying of the database is performed in an order established by the priority values.

In another embodiment, the reference key is assigned to two different device settings of the plurality of device settings of the policy type, and wherein the querying and fetching of the device setting by the endpoint computer are determined by the priority value.

In another embodiment, the method further comprises querying the database to resolve a configuration between two different device settings, the configuration applying to the endpoint computer at any given point in time based on the current attribute of the endpoint computer.

In another embodiment, the policy type includes a plurality of configuration endpoint settings including the two or more stored device settings, wherein the database stores the policy type assigned to the two or more device groups, and wherein the endpoint resolves the configuration between the two or more stored device settings by querying for a configuration endpoint setting of the plurality of configuration endpoint settings that applies to the device group at a point in time at which the query is performed by the endpoint computer.

In another embodiment, this disclosure provides for a computer system, comprising: one or more processors; one or more computer readable storage media; and computer readable code stored collectively in the one or more computer readable storage media, with the computer readable code including data and instructions to cause the one or more computer processors to perform a method comprising: storing, at a database by the one or more processors, a policy type having a plurality of device settings for a plurality of endpoint computers; assigning, by the one or more processors, a reference key to a device setting of the plurality of device settings, the reference key corresponding to a subset of endpoint computers of the plurality of endpoint computers; notifying, by the one or more processors, the subset of the endpoint computers of the policy type; querying, by an endpoint computer of the subset of the endpoint computers, the database for a device setting of the plurality of device settings based on a current attribute of the endpoint computer; and fetching, by the endpoint computer, the device setting.

In another embodiment, the device setting to which the reference key is assigned includes a first configuration value mapped to one or more individual endpoint computers of the plurality of endpoint computers and a second configuration value mapped to a group identification that includes the subset of endpoint computers.

In another embodiment, the method further comprises storing at the database a table generated by the one or more processors, wherein the table includes a plurality of rows, and wherein a row includes the device setting and the reference key assigned to the device setting; and querying, by the endpoint computer, the table for the device setting.

In another embodiment, the method further comprises storing at the database a plurality of assignment attributes, including an identification of each endpoint computer and a group identification of each of one or more groups of endpoint computers, wherein a group identification includes an identification of the subset of endpoint computers, and wherein each row of the table includes a different assignment attribute.

In another embodiment, the device setting is assigned to two or more device groups including the subset of the plurality of endpoint computers, and wherein the method further comprises: querying the database to resolve a configuration between two or more stored device settings of the plurality of device settings of the policy type, the configuration applying to the endpoint computer at any given point in time based on the current attribute of the endpoint computer.

In another embodiment, the policy type includes a plurality of configuration endpoint settings including the two or more stored device settings, wherein the database stores the policy type assigned to the two or more device groups, and wherein the endpoint resolves the configuration between the two or more stored device settings by querying for a configuration endpoint setting of the plurality of configuration endpoint settings that applies to the device group at a point in time at which the query is performed by the endpoint computer.

In another embodiment, this disclosure provides for a computer program product for policy management, the computer program product comprising: one or more computer readable storage media having computer readable program code collectively stored on the one or more computer readable storage media, the computer readable program code being executed by one or more processors of a computer system to cause the computer system to perform a perform a plurality of operations comprising: storing, at a database by the one or more processors, a policy type having a plurality of device settings for a plurality of endpoint computers; assigning, by the one or more processors, a reference key to a device setting of the plurality of device settings, the reference key corresponding to a subset of endpoint computers of the plurality of endpoint computers; notifying, by the one or more processors, the subset of the endpoint computers of the policy type; querying, by an endpoint computer of the subset of the endpoint computers, the database for a device setting of the plurality of device settings based on a current attribute of the endpoint computer; and fetching, by the endpoint computer, the device setting.

In another embodiment, the device setting to which the reference key is assigned includes a first configuration value mapped to one or more individual endpoint computers of the plurality of endpoint computers and a second configuration value mapped to a group identification that includes the subset of endpoint computers.

In another embodiment, the method further comprises storing at the database a table generated by the one or more processors, wherein the table includes a plurality of rows, and wherein a row includes the device setting and the reference key assigned to the device setting; and querying, by the endpoint computer, the table for the device setting.

In another embodiment, the row of the table includes a priority value for each device setting, which is arranged in the table according to the priority value, and wherein the querying of the database is performed in an order established by the priority values.

In another embodiment, the device setting is assigned to two or more device groups including the subset of the plurality of endpoint computers, and wherein the method further comprises: querying the database to resolve a configuration between two or more stored device settings of the plurality of device settings of the policy type, the configuration applying to the endpoint computer at any given point in time based on the current attribute of the endpoint computer.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes, systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules) may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policy to network traffic to prevent intrusion attempts to the containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method of policy management for enterprise endpoint computers, comprising:
   storing, at a database by one or more processors of a policy delivery system, a policy type having a plurality of device settings, each device setting defining one or more configuration values applicable to a plurality of endpoint computers;
   assigning, by the one or more processors of the policy delivery system, a reference key to a device setting of the plurality of device settings, the reference key serving as a unique identifier that represents a specific configuration of the device setting under the policy type, and used to associate the specific configuration of the device setting with respect to a subset of endpoint computers of the plurality of endpoint computers;
   notifying, by the one or more processors of the policy delivery system, the subset of the endpoint computers using the reference key of the policy type;
   querying, by an endpoint computer of the subset of the endpoint computers, the database for the device setting of the plurality of device settings associated with the policy type, wherein the query is based on a current attribute of the endpoint computer; and
   fetching, by the endpoint computer, the device setting corresponding to the reference key and applying the configuration value.

2. The method of claim 1, wherein the device setting to which the reference key is assigned includes a first configuration value mapped to one or more individual endpoint computers of the plurality of endpoint computers and a second configuration value mapped to a group identification that includes the subset of endpoint computers.

3. The method of claim 2, wherein the current attribute of the endpoint computer is time-dependent, and wherein the endpoint computer fetches the device setting having the first configuration value at a first point in time of the current attribute and fetches the device setting having the second configuration value at a second point in time of the current attribute.

4. The method of claim 1, further comprising:

storing at the database a table generated by the one or more processors, wherein the table includes a plurality of rows, and wherein a row of the plurality of rows includes the device setting and the reference key assigned to the device setting; and querying, by the endpoint computer, the table for the device setting.

5. The method of claim 4, further comprising:

storing at the database a plurality of assignment attributes, including an identification of each endpoint computer and a group identification of each of one or more groups of endpoint computers, wherein a group identification includes an identification of the subset of endpoint computers, and wherein each row of the table includes a different assignment attribute, wherein the querying the table for the device setting comprises querying, by the endpoint computer, the database for the device setting associated with the policy type, and wherein the method further comprises resolving a configuration conflict between multiple device settings based on a priority value associated with each setting, and fetching, by the endpoint computer, a resolved device setting corresponding to the reference key.

6. The method of claim 4, wherein the row of the table includes a priority value for each device setting, which is arranged in the table according to the priority value, and wherein the querying of the database is performed in an order established by the priority values.

7. The method of claim 6, wherein the reference key is assigned to two different device settings of the plurality of device settings of the policy type, and wherein the querying and fetching of the device setting by the endpoint computer are determined by the priority value.

8. The method of claim 1, wherein the method further comprises:

querying the database to resolve a configuration between two different device settings, the configuration applying to the endpoint computer at any given point in time based on the current attribute of the endpoint computer.

9. The method of claim 8, wherein the policy type includes a plurality of configuration endpoint settings including the two or more stored device settings, wherein the database stores the policy type assigned to two or more device groups, and wherein the endpoint resolves the configuration between the two or more stored device settings by querying for a configuration endpoint setting of the plurality of configuration endpoint settings that applies to a device group of the two or more device groups at a point in time at which the query is performed by the endpoint computer.

10. A computer system, comprising:

one or more processors;

one or more computer readable storage media; and computer readable code stored collectively in the one or more computer readable storage media, with the computer readable code including data and instructions to cause the one or more computer processors to perform a method comprising:

storing, at a database by the one or more processors, a policy type having a plurality of device settings, each device setting defining one or more configuration values applicable to a plurality of endpoint computers;

assigning, by the one or more processors, a reference key to a device setting of the plurality of device settings, the reference key serving as a unique identifier that represents a specific configuration of the device setting under the policy type, and used to associate the configuration of the device setting with respect to to a subset of endpoint computers of the plurality of endpoint computers;

notifying, by the one or more processors, the subset of the endpoint computers using the reference key of the policy type;

querying, by an endpoint computer of the subset of the endpoint computers, the database for the device setting of the plurality of device settings associated with the policy type, wherein the query is based on a current attribute of the endpoint computer; and fetching, by the endpoint computer, the device setting corresponding to the reference key and applying the configuration value.

11. The computer system of claim 10, wherein the device setting to which the reference key is assigned includes a first configuration value mapped to one or more individual endpoint computers of the plurality of endpoint computers and a second configuration value mapped to a group identification that includes the subset of endpoint computers.

12. The computer system of claim 10, wherein the method further comprises:

storing at the database a table generated by the one or more processors, wherein the table includes a plurality of rows, and wherein a row includes the device setting and the reference key assigned to the device setting; and querying, by the endpoint computer, the table for the device setting.

13. The computer system of claim 12, wherein the method further comprises:

storing at the database a plurality of assignment attributes, including an identification of each endpoint computer and a group identification of each of one or more groups of endpoint computers, wherein a group identification includes an identification of the subset of endpoint computers, and wherein each row of the table includes a different assignment attribute, wherein the querying the table for the device setting comprises querying, by the endpoint computer, the database for the device setting associated with the policy type, and wherein the method further comprises resolving a configuration conflict between multiple device settings based on a priority value associated with each setting, and fetching, by the endpoint computer, a resolved device setting corresponding to the reference key.

14. The computer system of claim 10, wherein the device setting is assigned to two or more device groups including the subset of the plurality of endpoint computers, and wherein the method further comprises:

querying the database to resolve a configuration between two or more stored device settings of the plurality of device settings of the policy type, the configuration applying to the endpoint computer at any given point in time based on the current attribute of the endpoint computer.

15. The computer system of claim 10, wherein the policy type includes a plurality of configuration endpoint settings including the two or more stored device settings, wherein the database stores the policy type assigned to two or more device groups, and wherein the endpoint resolves the configuration between the two or more stored device settings by querying for a configuration endpoint setting of the plurality of configuration endpoint settings that applies to a device group of the two or more device groups at a point in time at which the query is performed by the endpoint computer.

16. A computer program product for policy management, the computer program product comprising:

one or more computer readable storage media having computer readable program code collectively stored on the one or more computer readable storage media, the computer readable program code being executed by one or more processors of a computer system to cause the computer system to perform a plurality of operations comprising:

storing, at a database by the one or more processors, a policy type having a plurality of device settings, each device setting defining one or more configuration values applicable to a plurality of endpoint computers;

assigning, by the one or more processors, a reference key to a device setting of the plurality of device settings, the reference key corresponding serving as a unique identifier that represents a specific configuration of the device setting under the policy type, and used to associate the configuration of the device setting with respect to a subset of endpoint computers of the plurality of endpoint computers;

notifying, by the one or more processors, the subset of the endpoint computers using the reference key of the policy type;

querying, by an endpoint computer of the subset of the endpoint computers, the database for the device setting of the plurality of device settings associated with the policy type, wherein the query is based on a current attribute of the endpoint computer; and fetching, by the endpoint computer, the device setting corresponding to the reference key and applying the configuration value.

17. The computer program product of claim 16, wherein the device setting to which the reference key is assigned includes a first configuration value mapped to one or more individual endpoint computers of the plurality of endpoint computers and a second configuration value mapped to a group identification that includes the subset of endpoint computers.

18. The computer program product of claim 16, wherein the method further comprises:

storing at the database a table generated by the one or more processors, wherein the table includes a plurality of rows, and wherein a row includes the device setting and the reference key assigned to the device setting; and querying, by the endpoint computer, the table for the device setting including querying, the database for the device setting associated with the policy type, herein the method further comprises resolving a configuration conflict between multiple device settings based on a priority value associated with each setting, and fetching, by the endpoint computer, a resolved device setting corresponding to the reference key.

19. The computer program product of claim 18, wherein the row of the table includes a priority value for each device setting, which is arranged in the table according to the priority value, and wherein the querying of the database is performed in an order established by the priority values.

20. The computer program product of claim 16, wherein the device setting is assigned to two or more device groups including the subset of the plurality of endpoint computers, and wherein the method further comprises:

querying the database to resolve a configuration between two or more stored device settings of the plurality of device settings of the policy type, the configuration applying to the endpoint computer at any given point in time based on the current attribute of the endpoint computer.

*    *    *    *    *